Patented Apr. 19, 1932

1,854,480

UNITED STATES PATENT OFFICE

NATHAN M. MNOOKIN, OF KANSAS CITY, MISSOURI, ASSIGNOR OF ONE-HALF TO JOSEPH C. PATRICK, OF KANSAS CITY, MISSOURI

PLASTIC

No Drawing.   Application filed May 6, 1929. Serial No. 361,012.

This invention relates to improvements in the plastic described in the application of Joseph C. Patrick, Serial No. 239,808, filed December 13, 1927.

The plastic described in the aforesaid application is derived from the interaction of compounds of olefins of the formula $C_nH_{2n}$ with soluble polysulfides, especially those of the alkali metals, alkaline earth metals and ammonia, which may conveniently be termed "alkaline polysulfides". The mechanical properties of such plastics can be controlled to a considerable degree by regulation of the sulfur content of the polysulfide used in their preparation. For example, ethylene halogen additive compounds react with polysulfide solutions with a sulfur content corresponding approximately to the formulæ $CaS_4$ and $Na_2S_4$ to give a soft, pliable and elastic plastic, somewhat resembling soft vulcanized rubber in appearance, and mechanical properties while lower polysulfides corresponding in sulfur content to $Na_2S_2$ or $Na_2S_3$ or a mixture thereof give hard plastics which resemble vulcanite in appearance and mechanical properties. These plastics are characterized by a high sulfur content. The soft plastic derived from ethylene chloride may contain between 74 and 85% of sulfur while the hard plastic has a somewhat lower sulfur content. The hard plastic melts around 100 to 120° C., while the softer plastic softens above 140° C.

It has been found that many of the plastics produced in the manner described change considerably with time. For example, many samples of the soft plastic become gradually harder with age and after a period of some time lose their initial rubber-like character. Such hardened samples can be temporarily restored to their rubber-like state by moderate heating. The hard lower sulfur plastic also frequently deteriorates substantially, especially with respect to loss of flexibility and increased brittleness. Various substances, such as tannic acid, carbohydrates, such as starch, various oils and many other substances accelerate the change from the elastic to the hard, rigid form.

I have now discovered that the plastics may be substantially stabilized against such change with age, or owing to the addition of hardening agents of the type referred to, by subjecting them for substantial periods of time to a relatively high temperature. During this heat treatment it is preferred to maintain the plastic under suitable forming pressure in order to obtain the stabilized plastic in the form of sheets, slabs or other desired articles.

The stabilizing treatment may be applied to the plastics immediately after their production or after they have exhibited instability or hardening of the type described.

The degree of heat applied may vary over wide limits. Ordinarily, the time of heating will vary inversely with the temperature. The conditions of the heat treatment also depend to some extent upon the character of other substances which may be compounded with the plastic. Usually a temperature around 280° F. applied for around one hour, that is, a heat treatment comparable to short rubber cure, gives satisfactory results. Most mixes can be effectively stabilized at a temperature of about 270° F. applied for about one or two hours. Ordinarily temperatures above 212° F. are preferred, but lower temperatures may be employed, although somewhat less effective.

It is to be understood that various additions may be made to the plastic or plastic-sulfur mixture before subjecting the same to the heat treatment. Such additions may comprise sulfur, carbon black, zinc oxide, lead oxide, magnesium carbonate, magnesium oxide, calcium oxide, calcium carbonate, linseed oil, cottonseed oil, castor oil, paraffin oil, oleic acid, stearic acid, lineoleic acid, tannic acid, carbohydrates, such as starch, cellulose esters, cotton, cotton xanthate, pigments, glue, rubber and substances employed in rubber compounding. It is to be noted that added substances which ordinarily exert a hardening action on the plastic have no appreciable hardening effect after stabilization. The stabilized plastic, either with or without additions, may be milled and compounded with such substances without regenerating the tendency to harden.

The invention will be more completely understood from the following examples. The plastic employed therein is soft high sulfur plastic derived from ethylene.

Example I

|   | Per cent |
|---|---|
| Plastic (83% sulfur) | 90.0 |
| Sulfur | 10.0 |

The substances are milled together at about 175° F. On standing the mixture became hard with a somewhat tenacious fracture. A part was heated for 2½ hours at 240° F. The product was a soft rubber-like mixture which became semi-rigid in about one month. Another sample heated to 240° F. for 16 hours had similar initial properties and at the end of a month its rubber-like qualities had diminished only slightly. Another sample which was subjected to a temperature of 286° F. for about one hour possessed qualities similar to those of very superior live vulcanized rubber, which it retained without apparent diminution after the lapse of more than one month.

Example II

|   | Per cent |
|---|---|
| Plastic (83% sulfur) | 70.4 |
| Zinc oxide | 14.1 |
| Sulfur | 7.8 |
| Aniline | 0.7 |
| Hard wood pitch | 7.0 |

The mixture was processed in the manner described in connection with Example I, similar results being obtained. The best product was that which was heat treated for about on hour as 286° F.

Example III

|   | Per cent |
|---|---|
| Plastic (83% sulfur) | 85.0 |
| Cellulose nitrate | 5.0 |
| Carbon black | 5.0 |
| Zinc oxide | 5.0 |

The milled product became gradually harder on standing. A sample heated to 286° F. for about one hour gave a soft, pliable and elastic product which retained these qualities without apparent diminution after a considerable period.

Example IV

|   | Per cent |
|---|---|
| Plastic (83% sulfur) | 98.0 |
| Cotton | 1.0 |
| Iron oxide | 1.0 |

A sample of the milled product heated at 286° F. for about one hour gave a soft, pliable product which showed no signs of hardening.

Example V

|   | Per cent |
|---|---|
| Plastic (83% sulfur) | 90 |
| Linseed oil | 10 |

A sample of the milled product heated at 270° F. for two hours gave a soft, pliable product of permanent characteristic.

Example VI

|   | Per cent |
|---|---|
| Plastic (75% sulfur) | 95 |
| Litharge | 5 |

The milled product, heated to about 295° F. for one hour, gave a permanently soft, pliable product. This product, like the plastic itself, is highly resistant to the action of oils, particularly petroleum oils, and has exceedingly high dielectric qualities.

The stabilizing action of the heating process, as hereinbefore described, is effective with the plastic itself, as well as with the various compounds thereof, such as those hereinbefore referred to.

Although the present invention has been described in connection with the details of specific examples thereof, it is not intended that such details shall be regarded as limitations upon the scope of the invention except in so far as included in the accompanying claims.

I claim:

1. The method of stabilizing the reaction products of polysulfides and olefins of the formula $C_nH_{2n}$, which comprises heating said products to a relatively high temperature and for sufficient time to stabilize the mechanical properties thereof.

2. The method of stabilizing the reaction products of polysufides and olefins of the formula $C_nH_{2n}$ together with additional substances of the type set forth, which comprises heating said products to a relatively high temperature and for sufficient time to stabilize the mechanical properties thereof.

3. The method of stabilizing the reaction products of polysulfides and olefins of the formula $C_nH_{2n}$, which comprises subjecting said products to relatively high heat and for sufficient time to stabilize said products with respect to pliability and elasticity.

4. The method of stabilizing the reaction products of polysulfides and olefins of the formula $C_nH_{2n}$, which comprises heating such products to at least 212° F. for a length of time sufficient to cause said products to acquire properties of pliability, softness and a wide degree of elasticity and to retain same substantially undiminished after a substantial length of time.

5. The method of stabilizing a mixture of plastic reaction products of polysulfides and olefins of the formula $C_nH_{2n}$ and sulfur, which comprises heating said mixture to a high temperature and for a sufficient length of time to impart to the mixture substantially permanent qualities of softness and pliability.

6. The method of stabilizing a mixture of plastic reaction products of polysulfides and olefins of the formula $C_nH_{2n}$ and litharge, which comprises heating the mixture thereby rendering it capable of retaining softness and pliability over prolonged periods of time.

7. The method of stabilizing plastic reaction products of soluble polysulfides and olefins of the formula $C_nH_{2n}$, which comprises heating said products to a rubber vulcanizing temperature.

8. The method of stabilizing a mixture of the reaction products of polysulfides and olefins of the formula $C_nH_{2n}$ and additional substances of the type set forth, which comprises heating said mixture to rubber vulcanizing temperatures under rubber vulcanizing conditions.

9. The method of stabilizing a mixture of the reaction products of polysulfides and olefins of the formula $C_nH_{2n}$ and sulfur, which comprises heating the mixture under rubber vulcanizing conditions as to time and temperature.

10. The method of stabilizing a mixture of the reaction products of polysulfides and olefins of the formula $C_nH_{2n}$ and litharge, which comprises heating the mixture under rubber vulcanizing conditions as to time and temperature.

11. The method of treating the reaction products of polysulfides and olefins of the formula $C_nH_{2n}$, comprising heating said products to about 280 degrees Fahrenheit for about one hour.

12. The method of treating the reaction products of polysulfides and olefins of the formula $C_nH_{2n}$ and additional substances of the type set forth, which comprises heating the mixture to a temperature of about 280 degrees Fahrenheit for about one hour.

13. The method of treating the reaction products of polysulfides and olefins of the formula $C_nH_{2n}$ and sulfur, which comprises heating the mixture to a temperature of about 280 degrees Fahrenheit for about one hour.

14. The method of treating a mixture of the reaction products of polysulfides and olefins of the formula $C_nH_{2n}$ and sulfur, which comprises heating the mixture to a temperature of at least 212 degrees Fahrenheit for a sufficient length of time to stabilize the mixture and render it permanently rubber-like in character.

15. The method of treating a mixture of the reaction products of polysulfides and olefins of the formula $C_nH_{2n}$ and litharge, the mixture containing at least 75% of sulfur which comprises heating the mixture to above 212 degrees Fahrenheit for a time sufficient to stabilize and render permanent the characteristics of the mixture.

16. An olefin polysulfide plastic having substantially permanent characteristics of softness and flexibility, and a plastic comprising the reaction products of polysulfides with olefins of the formula $C_nH_{2n}$ and having substantially permanent characteristics of softness and flexibility.

17. A product comprising the reaction products of polysulfides and olefins of the formula $C_nH_{2n}$ and sulfur, which has substantially permanent characteristics of softness and flexibility.

18. A product comprising the reaction products of polysulfides and olefins of the formula $C_nH_{2n}$ and litharge, which has substantially permanent characteristics of softness and flexibility.

19. A substantially permanently soft pliable product comprising the reaction products of polysulfides higher than the trisulfide and olefins of the formula $C_nH_{2n}$ and litharge.

20. A substantially permanently soft pliable product comprising the reaction products of polysulfides higher than the trisulfide and olefins of the formula $C_nH_{2n}$ and sulfur.

In witness whereof, I have hereunto set my hand this 2nd day of May, 1929.

NATHAN M. MNOOKIN.